(12) United States Patent
Mizutani

(10) Patent No.: US 12,474,491 B2
(45) Date of Patent: Nov. 18, 2025

(54) DETECTOR FOR RADIOACTIVE RAY

(71) Applicant: CANON KABUSHIKI KAISHA, Tokyo (JP)

(72) Inventor: Fumiaki Mizutani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 418 days.

(21) Appl. No.: 18/162,014

(22) Filed: Jan. 31, 2023

(65) Prior Publication Data
US 2023/0258833 A1 Aug. 17, 2023

(30) Foreign Application Priority Data
Feb. 14, 2022 (JP) ................................. 2022-020118

(51) Int. Cl.
*G01T 1/29* (2006.01)
(52) U.S. Cl.
CPC .................................. *G01T 1/2928* (2013.01)
(58) Field of Classification Search
CPC .................................................... G01T 1/2928
See application file for complete search history.

(56) References Cited

U.S. PATENT DOCUMENTS

| | | | |
|---|---|---|---|
| 8,890,331 B2 | 11/2014 | Shimotsusa et al. | |
| 9,029,241 B2 | 5/2015 | Shimotsusa et al. | |
| 9,368,544 B2 | 6/2016 | Shimotsusa et al. | |
| 9,881,957 B2 | 1/2018 | Shimotsusa et al. | |
| 10,546,891 B2 | 1/2020 | Shimotsusa et al. | |
| 11,011,558 B2 | 5/2021 | Sakaguchi et al. | |
| 11,437,421 B2 | 9/2022 | Shimotsusa et al. | |
| 2013/0221473 A1 | 8/2013 | Shimotsusa et al. | |
| 2019/0140002 A1 | 5/2019 | Sakaguchi et al. | |
| 2020/0203408 A1 | 6/2020 | Nagata et al. | |
| 2020/0321364 A1 | 10/2020 | Sejima | |
| 2022/0246655 A1 | 8/2022 | Nagata et al. | |
| 2022/0375981 A1 | 11/2022 | Shimotsusa et al. | |

FOREIGN PATENT DOCUMENTS

| | | | | |
|---|---|---|---|---|
| JP | 2006-287123 A | 10/2006 | | |
| JP | 2013-182923 A | 9/2013 | | |
| JP | 2019-040893 A | 3/2019 | | |
| JP | 2019-087640 A | 6/2019 | | |
| WO | WO-2014129507 A1 * | 8/2014 | ............ | G01T 1/241 |
| WO | 2019/078291 A1 | 4/2019 | | |

* cited by examiner

*Primary Examiner* — David P Porta
*Assistant Examiner* — Fani Polyzos Boosalis
(74) *Attorney, Agent, or Firm* — Venable LLP

(57) ABSTRACT

A detector includes: a first member that detects a radioactive ray; a second member located around the first member; a third member having a first opening overlapping at least a part of a first region on which the first member is projected in a planar view including the first member and the second member; a fourth member having a second opening overlapping at least a part of the first region in the planar view and having higher thermal conductivity than the third member; and a penetration part provided in a third region overlapping the fourth member outside a second region on which the second member is projected in the planar view, connected to the fourth member, connected to the second member via a thermal conductive member, and having higher thermal conductivity than the third member.

18 Claims, 14 Drawing Sheets

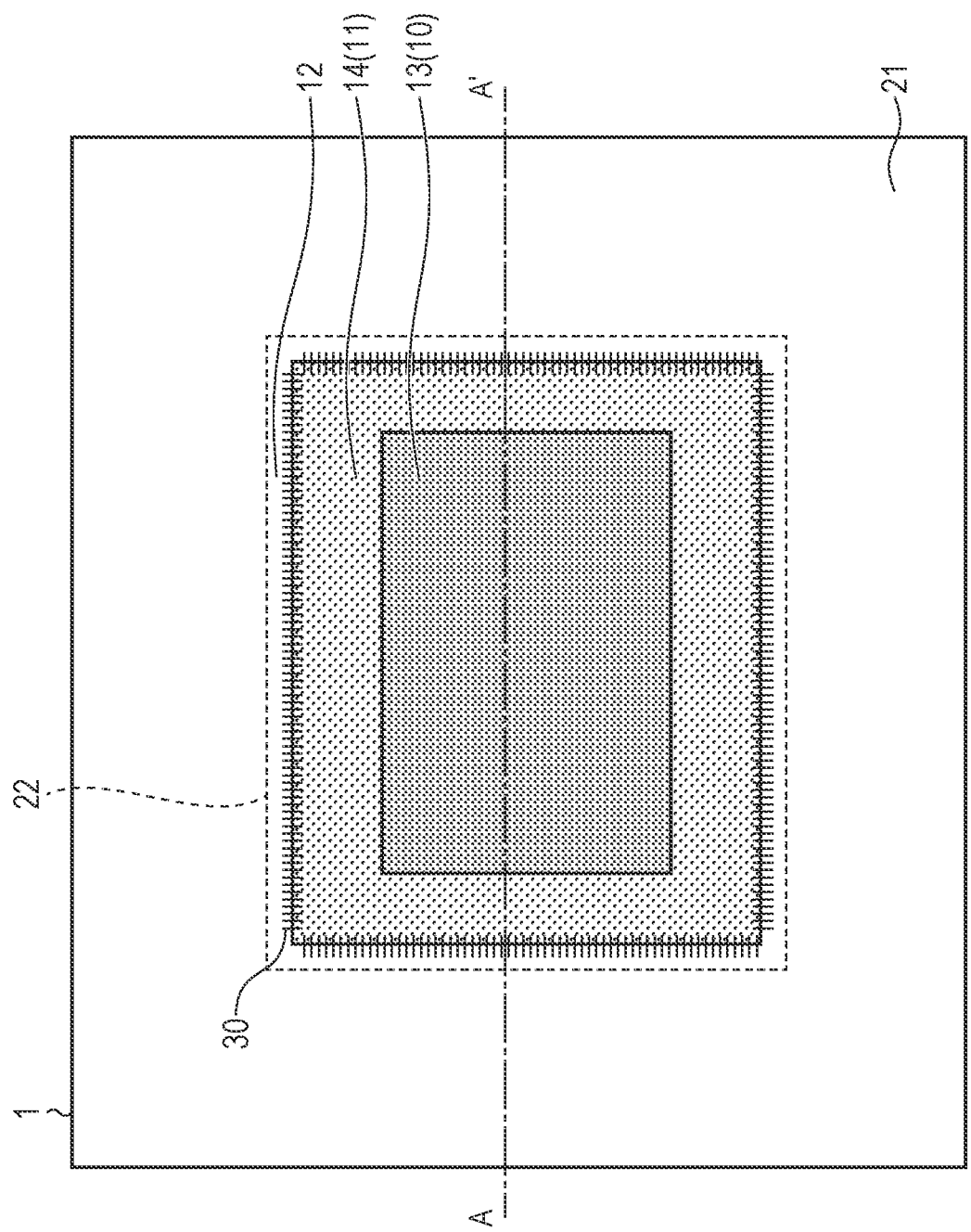

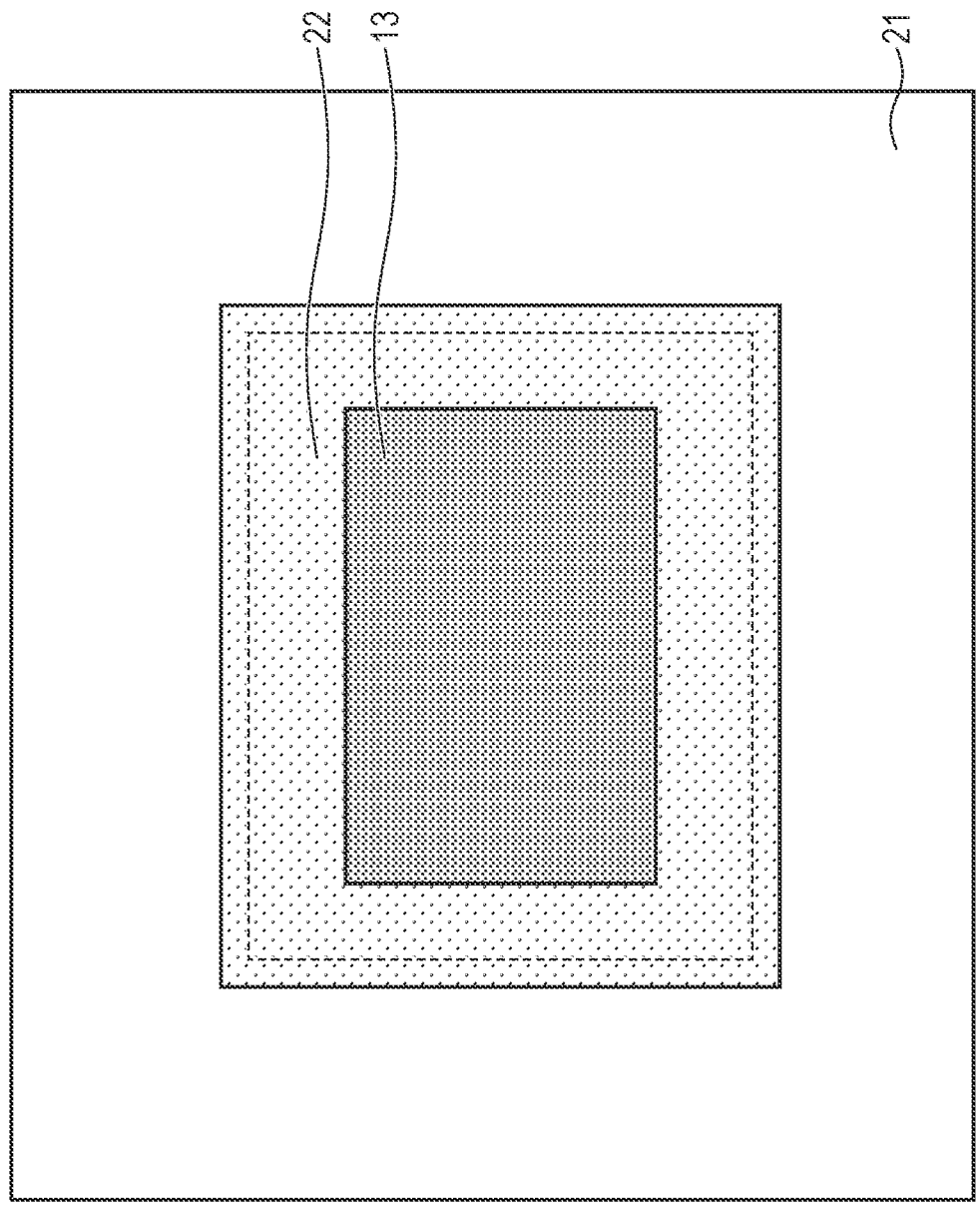

DETECTOR FOR RADIOACTIVE RAY

BACKGROUND OF THE INVENTION

Field of the Invention

The present invention relates to a detector for a radioactive ray.

Description of the Related Art

In detectors with a CMOS image sensor or the like, a semiconductor layer that can directly detect electrons may suffer from reduced detection accuracy due to occurrence of cross-talk or secondary electrons upon entry of electrons to a deep part. It is effective to thin the semiconductor layer to suppress a reduction in detection accuracy, and Japanese Patent Application Laid-Open No. 2019-087640 discloses a detector structure whose detection region is made thinner than the peripheral region. Further, International Publication No. 2019/078291 discloses a detector structure including a mechanical support layer for easily providing a thinned structure. Further, Japanese Patent Application Laid-Open No. 2013-182923 discloses such a structure that improves cooling performance by connecting a thermal conductor to the backside of a detector and increasing the surface area of the thermal conductor while ensuring the strength of the detector.

In CMOS sensors or CCD sensors used as a detector, an increased number of pixels and high-speed driving increase power consumption and also increase heat quantity. To cool the sensor generating heat, it is effective to provide a cooling unit on the backside of the sensor. In a detector for radioactive rays, however, a radioactive ray may transmit through the thinned detection region to the backside thereof and undesirably generate reflection or scattering between the backside and the cooling unit. When no cooling unit is arranged to the backside of the detection region and this results in insufficient cooling, dark current or thermal noise increases due to generated heat, and this reduces the sensitivity or the resolution of the detector.

SUMMARY OF THE INVENTION

The present invention has been made in view of the above problem and intends to provide a technology that is advantageous in improving the cooling performance of a detector that detects radioactive rays and enhancing the sensitivity or the resolution of the detector.

According to one aspect of the present invention, provided is a detector including: a first member that detects a radioactive ray; a second member located around the first member; a third member having a first opening overlapping at least a part of a first region on which the first member is projected in a planar view including the first member and the second member; a fourth member having a second opening overlapping at least a part of the first region in the planar view and having higher thermal conductivity than the third member; and a penetration part provided in a third region overlapping the fourth member outside a second region on which the second member is projected in the planar view, connected to the fourth member, connected to the second member via a thermal conductive member, and having higher thermal conductivity than the third member.

Further features of the present invention will become apparent from the following description of exemplary embodiments with reference to the attached drawings.

BRIEF DESCRIPTION OF THE DRAWINGS

FIG. 1A is a configuration diagram in the planar view of a detector according to a first embodiment.

FIG. 1C is a configuration diagram in the planar view of the detector according to the first embodiment.

DESCRIPTION OF THE EMBODIMENTS

While embodiments of the present invention will be described below with reference to the drawings, the present invention is not limited to the embodiments described below. Note that, in the following description and drawings, configurations common throughout a plurality of drawings are labeled with common references. Thus, a plurality of drawings will be cross-referenced to describe such common configurations, and the description for configurations labeled with the common references will be omitted as appropriate. In addition, while a plurality of embodiments will be described, description of features of one embodiment that may be the same as those of another embodiment will be omitted.

First Embodiment

Figure 1B:
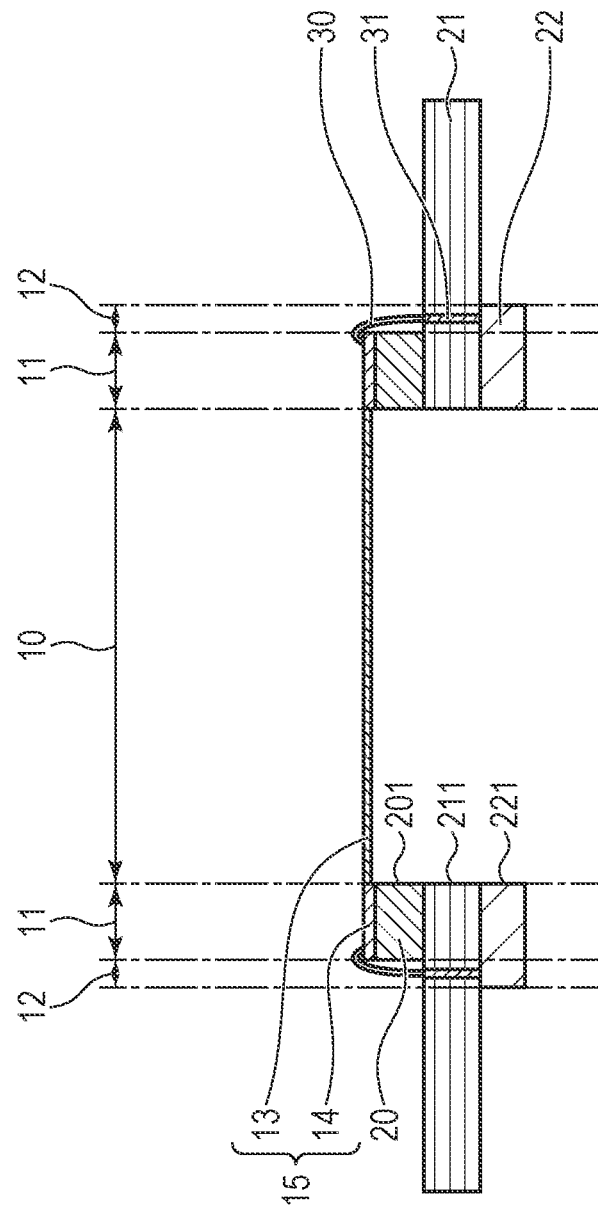
FIG. 1B is a sectional configuration diagram of the detector according to the first embodiment.
Figure 2A:
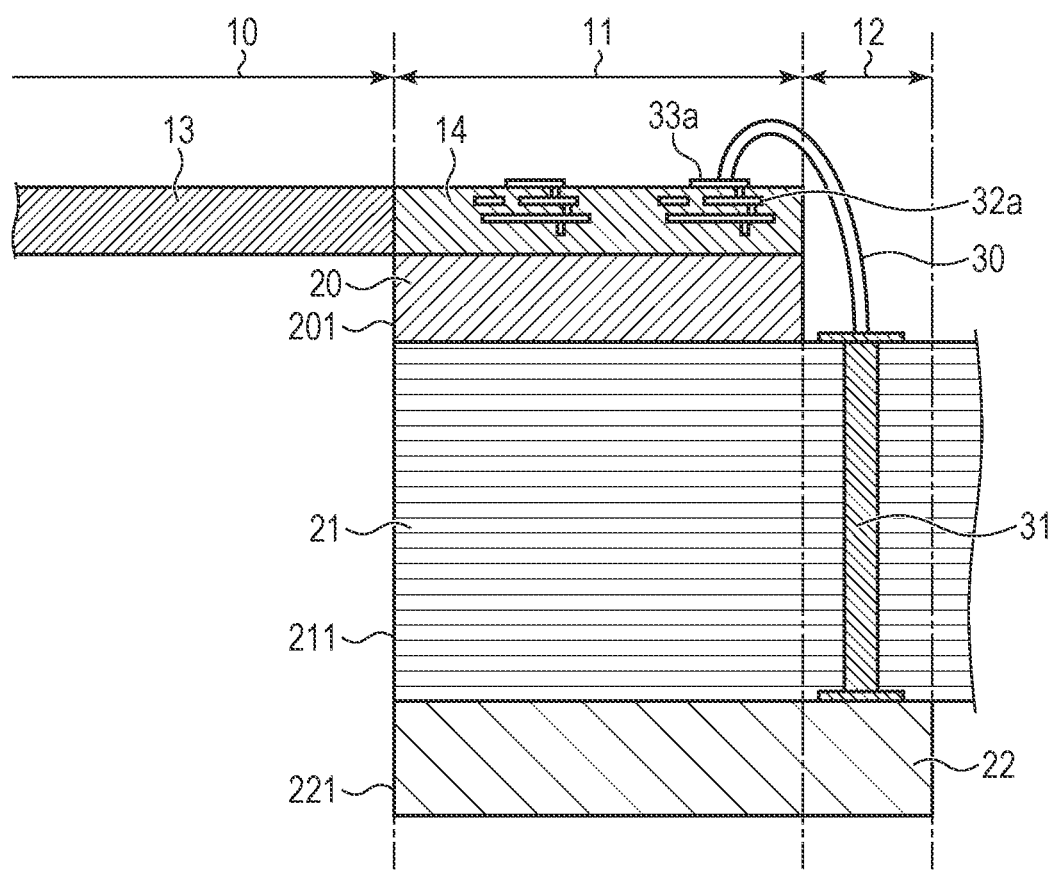
FIG. 2A is a sectional configuration diagram of the detector according to the first embodiment.

A first embodiment according to the present invention will be described below with reference to FIG. 1A to FIG. 2A. FIG. 1A, FIG. 1B, and FIG. 1C illustrate configuration diagrams of a detector 1 according to the present embodiment. FIG. 1A illustrates a top view when the detector 1 is viewed in a planar view from the top side. FIG. 1B illustrates a sectional view of the detector 1 taken along a line A-A' of FIG. 1A. FIG. 1C illustrates an underside view of the detector 1 when viewed in the planar view from the underside. FIG. 2A illustrates a sectional view enlarging a portion of the right side of the detector 1 in FIG. 1B.

As illustrated in FIG. 1A, FIG. 1B, and FIG. 1C, the detector 1 has a first member 13, a second member 14, a third member 21, a fourth member 22, a thermal conductive member 30, and a penetration part 31. The detector 1 is an image sensor having a built-in semiconductor layer 15 including the first member 13 that detects a radioactive ray and the second member 14 that processes a detected signal.

The first member 13 and the second member 14 are formed of the semiconductor layer 15. The semiconductor layer 15 is preferably a single crystal layer of silicon, germanium, or the like or may be a multi-crystal layer. Further, it is desirable that the first member 13 and the second member 14 have an integrated structure manufactured from a semiconductor substrate. The planar shape of and the positional relationship between the first member 13 and the second member 14 are not particularly limited. In the present embodiment, however, the second member 14 is provided so as to be located around the first member 13 and have a rectangular, annular planar shape around the first member 13 having a rectangular planar shape, for example. In the planar view including both the first member 13 and the second member 14, a region on which the first member 13 is projected is defined as a first region 10, and a region on which the second member 14 is projected is defined as a second region 11. The plane including both the first member 13 and the second member 14 may include the top surface of the first member 13 and the top surface of the second member 14, for example. Further, the plane including both the first member 13 and the second member 14 may be, for example, a virtual plane penetrating both the first member 13 and the second member 14.

The first member 13 is a part of the detector that converts electrons generated by incidence of a radioactive ray into an output signal. The first member 13 includes a plurality of pixels and reading circuits for forming an image based on a radioactive ray and has a structure in which the plurality of pixels and reading circuits are aligned therein. The first member 13 may contain silicon, germanium, or cadmium.

The second member 14 is a peripheral circuit and is provided with a drive circuit, a control circuit, an input/output terminal unit, a signal processing circuit, an output circuit, and the like. The input/output terminal unit includes an input terminal unit and an output terminal unit. The drive circuit scans and drives the reading circuits of the first member 13. The control circuit is a circuit for controlling drive timings of the drive circuit, the signal processing circuit, and the like and includes a timing generator or the like. Power supply and control signals are externally input to the input terminal unit. Signals are externally output from the output terminal unit. The signal processing circuit is a circuit for processing signals from the reading circuits arranged in the first member 13 and includes an amplifier circuit and an AD conversion circuit. The output circuit is a circuit for converting a signal obtained by the signal processing circuit into a predetermined form to output the converted signal and includes a differential transmission circuit.

The detector 1 is a complementary metal oxide semiconductor (CMOS) or a charge coupled device (CCD) that is a typical image sensor. The CMOS or the CCD employs a method of transferring electrons accumulated in a photodiode to a floating diffusion layer via a transfer transistor and reading the potential via a source follower. The CMOS or the CCD may employ a reading method of directly determining the potential of an accumulation portion as the gate potential of a source follower without using a transfer transistor. Further, the detector 1 may use a photo-counting principle and may use a device such as a single photon avalanche diode (SPAD) as the detector 1.

As illustrated in FIG. 1B, a support part 20 is provided on the third member 21 so as to support the semiconductor layer 15 including the first member 13 and the second member 14 by the second region 11. Note that, in the description of the present embodiment, the side in contact with the support part 20 of the first member 13 and the second member 14 is defined as the back surface side, and the other side is defined as a front surface side. The support part 20 is provided with an opening 201 that exposes the whole or a part of the back surface of the first member 13. A radioactive ray that is a detection target of the detector 1 is irradiated onto the first member 13 from the front surface side of the first member 13 and transmits through the first member 13 to the back surface side of the first member. To prevent the radioactive rays from colliding therewith and scattering, it is desirable to vacuum the first region 10 of the front surface side and the back surface side of the first member 13. Operating the detector 1 in a vacuum will be a way or means for vacuuming the first region 10 of the front surface side and the back surface side of the first member 13. Further, while the overall detector 1 may be operated in a vacuum, only the structure of a part including the first region 10 in the detector 1 may be operated in a vacuum. For example, the space formed of at least the opening of the support part 20 may be a vacuum. Further, the vacuumed portion of the first region 10 may be the space formed of at least the opening of the support part 20.

A case where the detector 1 is irradiated with an electron beam as an example of a radioactive ray will be described. In response to an electron beam entering the first member 13, the secondary electrons occur inside the first member 13, and this may cause a reduction in the resolution due to cross-talk between pixels. When the thickness of the first member 13 is greater than a predetermined value, the secondary electrons expand in wider range, and a reduction in the resolution becomes significant. In contrast, when the first member 13 is thinner than a desired value, secondary electrons less occur, and this causes a reduced signal. As a result, the S/N of the detector 1 decreases. Thus, there is a preferable range for the thickness of the first member 13. The thickness of the first member 13 for suppressing crosstalk while having a sufficient sensitivity may be preferably greater than or equal to 10 µm and less than or equal to 100 µm. Typically, the thickness of the first member 13 may be greater than or equal to 25 µm and less than or equal to 75 µm. Note that the first member 13 can be configured so that the thickness of at least a part thereof is within such a preferable range. When the first member 13 and the second member 14 are formed of an integrated member such as a semiconductor substrate, thinning processing to have the thickness described above may be performed at the same time, or only the first member 13 may be thinned by etching processing. Although the thickness of the first member 13 is illustrated smaller than the thickness of the second member 14 in the present embodiment, the same effect as the cooling effect of the present embodiment can be obtained even when the thickness of the first member 13 and the thickness of the second member 14 are the same.

Although the case where an electron beam is detected as an example of a radioactive ray detected by the detector 1 has been described above, the effect of the present invention is effective also for a case of other radioactive rays. The radioactive ray that is a detection target of the detector 1 may be an ionizing radiation such as an X-ray or a gamma ray or may be a particle beam such as an alpha ray, a beta ray, a neutron ray, a proton ray, a heavy ion ray, a meson ray, or the like. The present embodiment is preferable to detect an electron beam, however, when a radioactive ray other than electron beams is detected, the structure of the detector 1, in particular, the thickness of the first member 13 may be adjusted in accordance with the transmission characteristic or the absorption characteristic of the radioactive ray.

The support part 20 is adhered to the back surface of the second member 14 via an adhesive agent in the second region 11 to reinforce the mechanical strength of the first member 13 and the second member 14. The material of the support part 20 may be a semiconductor, an insulator, or a conductor. To reduce the stress between the first member 13 and the second member 14, however, it is preferable that the support part 20 have a thermal expansion coefficient close to the first member 13 and the second member 14. That is, for example, when the first member 13 and the second member 14 are silicon, it is preferable that the support part 20 be silicon, and when the first member 13 and the second member 14 are germanium, it is preferable that the support part 20 be also germanium. The support part 20 may be a semiconductor single crystal whose crystal structure is continuous to the second member 14.

The third member 21 is a circuit substrate, which may be, for example, a printed circuit board (PCB) or a ceramic substrate. The support part 20 is provided on one surface of the third member 21. The third member 21 is provided with an opening 211 that exposes the whole or a part of the back surface of the first member 13. The third member 21 is electrically connected to the second member 14 supported by the support part 20. Further, electric components (not illustrated) are arranged to the third member 21. While the third member 21 has a larger area than the second member 14 in the planar view in order to arrange a number of electric components thereon, some of the components may be mounted on a separate substrate (not illustrated).

The fourth member 22 is provided on the surface on the opposite side of the surface on which the support part 20 of the third member 21 is provided. The opening 221 that exposes the whole or a part of the back surface of the first member 13 is provided. The fourth member 22 is a member using a material having high thermal conductivity and is connected to a cooler (not illustrated) on the back surface side. In particular, the fourth member 22 has higher thermal conductivity than the third member 21. The heat generated by the first member 13 and the second member 14 is dissipated to the cooler via the support part 20, the third member 21, and the fourth member 22.

When a radioactive ray transmits through the first member 13, to suppress scattering or reflection of the transmitting radioactive ray, it is desirable that the opening 201 of the support part 20, the opening 211 of the third member 21, and the opening 221 of the fourth member 22 be openings overlapping at least a part of the first region 10, respectively. When the openings 201, 211, and 221 of the support part 20, the third member 21, and the fourth member 22 are each narrower than the first region 10, an unnecessary signal serves as noise due to scattering or reflection of the radioactive ray and deteriorates the imaging performance. The side surfaces of the opening 201, the opening 211, and the opening 221 may match each other. Further, the space defined by the opening 201, the opening 211, and the opening 221 may be in a vacuum.

On the other hand, the support part 20, the third member 21, and the fourth member 22 are heat dissipation path that dissipates heat from the generated heat of the first member 13 and the second member 14.

When a portion overlapping the first region 10 corresponds to the openings 201, 211, and 221 in each portion, for example, the portion overlapping the frame-shaped area of the second region 11 is a heat dissipation path. In such a case, however, since the contact area between the members decreases, the thermal resistance increases compared to a case where there is no opening 201, 211, and 221.

Therefore, the size of the openings 201, 211, and 221 is preferably narrower as long as radioactive rays are not scattered or reflected. Specifically, in FIG. 1B, it is desirable that the edge ends of the openings 201, 211, and 221 of the support part 20, the third member 21, and the fourth member 22 be located on the boundary between the first region 10 and the second region 11. The structure described above is the basic structure of the detector 1.

It is assumed that the first member 13 and the second member 14 have power consumption of about 0.1 W to several 10 W during driving, and there is a problem of increased dark current in the pixel unit due to a rise in the temperature caused by heat generation. The power consumption will further increase when the number of pixels of the first member 13 is increased to achieve increased resolution, when the number of signal lines is increased to achieve an increased speed, when the signal processing in the second member 14 is accelerated, or the like.

As a general countermeasure against heat of a semiconductor device, it is known to employ a scheme of air-cooling a semiconductor device surface or to dissipate heat by arranging a material having high thermal conductivity or a heatsink to the back surface of a portion where a temperature rises. Since the detector 1 preferably operates in a vacuum, however, it is difficult to air-cool the detector 1, and cooling from the back surface via the openings 201, 211, and 221 described above is also insufficient. Furthermore, the thermal resistance in the horizontal direction increases because the first member 13 is thinned, and difficulty in cooling is a problem.

Details of intervening members from the heat generation source to the cooler in the detector 1 according to the present embodiment will be described below. Connection parts between the second member 14 and the support part 20, between the support part 20 and the third member 21, between the third member 21 and the fourth member 22, and between the fourth member 22 and the cooler (not illustrated) are required to be connected by connecting materials, respectively. Note that the connecting material may be an adhesive agent, grease, gel, solder, a die bond material, or the like. Thus, in each connection, it is inevitable that a plurality of intervening members be present. Furthermore, it is difficult to control the thickness of a material such as an adhesive agent, grease, gel, or the like, and the thermal resistance varies in proportion to the thickness.

Further, the number of layers of wiring layers and insulating layers in the third member 21, which is a circuit substrate, has been increased, and the substrate material is restricted in manufacturing. PCBs frequently used as circuit substrates in general enable an increase in the number of layers but have low thermal conductivity. As an example, the thermal conductivity of a Flame Retardant type 4 (FR4) substrate is 0.2 W/(m·K) to 0.4 W/(m·K). On the other hand, circuit substrates having high thermal conductivity, such as an alumina substrate ($Al_2O_3$, 14 W/(m·K)), an AlN substrate (150 W/(m·K)), or the like have been developed. In a circuit substrate having high thermal conductivity, however, there are other problems of increased cost due to the material or increased number of layers, occurrence of substrate warpage in a ceramic manufacturing process, and the like. These problems may be an obstacle to the choice of a circuit substrate having high thermal conductivity. Use of the present invention also contributes to providing a detector at low cost.

As a solution to the problem described above, it is effective to use a material having high thermal conductivity for all the intervening members from a heat generation source to a cooler. Further, a reduction of the number of intervening members or expansion of the area serving as a heat dissipation path also has an effect of reducing thermal resistance and thus is effective.

Accordingly, the present embodiment has a structure in which the third member 21 has the third region 12 overlapping the fourth member 22 outside the second region 11 in the planar view and that the third member 21 has the penetration part 31 arranged in the third region 12. Herein, the penetration part 31 is a member with a material having higher thermal conductivity than the third member 21 and may be a thermal conductor or an electrical conductor material. Further, the penetration part 31 is connected to the fourth member 22 and connected to the second member 14 via the thermal conductive member 30 on the opposite side. The thermal conductive member 30 is connected to the front surface side of the second member 14. Note that the third region 12 is a region from the solid line indicating the outer circumference of the second region 11 to the broken line indicating the outer circumference of the fourth member 22 in FIG. 1A.

The penetration part 31 may have gold (Au), tungsten (W), copper (Cu), titanium (Ti), tantalum (Ta), aluminum (Al), ruthenium (Ru), or carbon graphite as a material having high thermal conductivity included in at least a part thereof. Similarly, a material having high thermal conductivity may be used for the fourth member 22. However, since the fourth member 22 has a larger shape than the penetration part 31, a copper (Cu) alloy that is relatively low cost may be used, for example. Note that, although it is desirable that the thermal conductive member 30, the penetration part 31, and the fourth member 22 be made of materials having high thermal conductivity, these materials are not necessarily required to be the same material.

According to the present embodiment, the heat dissipation path that transfers generated heat of the first member 13 and the second member 14 to the fourth member 22 via the thermal conductive member 30 and the penetration part 31 can be added to the heat dissipation path that transfers the generated heat to the fourth member 22 via the support part 20 and the third member 21. Thus, according to the present embodiment, the overall thermal resistance of the detector 1 can be reduced. Further, since the thermal conductive member 30 is connected to the front surface side of the second member 14, the second member 14 can be cooled from both of the back surface side connected to the support part 20 and the front surface side connected to the thermal conductive member 30.

In FIG. 1B, consideration is made to a thermal resistance connected from the second member 14 to the front surface of the fourth member 22 via the third member 21. General thermal resistance r (K/W) is given by the following equation:

$$r = d/(A \cdot \lambda),$$

where d denotes a thickness (m), A denotes an area (m$^2$), and $\lambda$ denotes thermal conductivity (W/(m·K)).

When the third member 21 is a PCB substrate having a thickness of 0.003 m, a sectional area of 0.001 m$^2$ orthogonal to the thickness direction overlapping the second member 14 except the opening 211, and thermal conductivity of 0.2 W/(m·K), thermal resistance r1 of the third member 21 is calculated as with the following equation:

$$r1 = 0.003 \text{ (m)}/0.2 \text{ (W/(m·K))}/0.001 \text{ (m}^2\text{)} \approx 15.0 \text{ (K/W)}.$$

A thermal resistance of the adhesive agent layer or the like for connecting the third member 21 is added thereto.

On the other hand, consideration is made to the thermal resistance of the thermal conductive member 30 and the penetration part 31. The thermal conductive member 30 and the penetration part 31 have high thermal conductivity and do not have any adhesive agent or the like therebetween while having a smaller area than the third member. Thus, with the thermal conductive member 30 and the penetration part 31, preferably with a plurality of thermal conductive members 30 and penetration parts 31 being arranged, the heat dissipation effect can be obtained.

For example, it is assumed that the thermal conductive member 30 is an Au bonding wire having a length of 1 mm and a diameter of 100 μm in a circular cross section and the penetration part 31 is a Cu via having a thickness of 3 mm and a diameter of 300 μm in a circular cross section. The thermal conductivity of Au and the thermal conductivity of Cu are 315 W/(m·K) and 400 W/(m·K), respectively. The thermal resistance r when the number of thermal conductive members 30 and penetration parts 31 is 100 is calculated as with the following equation:

$$r = 0.001 \ (m)/315 \ (W/(m \cdot K))/(0.00005 \ (m) \times$$
$$0.00005 \ (m) \times \pi \times 100 \ (\text{quantity})) +$$
$$0.003 \ (m)/400 \ W/(m \cdot K)/(0.00015 \ (m) \times 0.00015 \ (m) \times$$
$$\pi \times 100 \ (\text{quantity})) \approx 5.10 \ (K/W).$$

Therefore, when the thermal resistance from the second member 14 to the front surface of the fourth member 22 is considered, the thermal resistance of 5.10 (K/W) of the heat dissipation path of the thermal conductive member 30 and the penetration part 31 is added in parallel to the thermal resistance of 15.0 (K/W) of the heat dissipation path via the third member 21 in the present embodiment. Thus, in the present embodiment, the thermal resistance from the second member 14 to the front surface of the fourth member 22 is approximately 3.8 (K/W) that is the thermal resistance combining both the thermal resistances, and the thermal resistance can be reduced to ⅓ or lower compared to a case without the thermal conductive member 30 and the penetration part 31.

Note that a substrate having a high thermal conductivity can also be employed as the third member 21. In such a case, the thermal resistance can be further reduced. Further, as illustrated in FIG. 2A, the thermal conductive member 30 may be connected to the second member 14 via an electrode 33a provided on the front surface side of the second member 14. The electrode 33a is connected to a wiring layer 32a formed inside the second member 14 and can cool the second member 14 by using a low thermal resistance, and a large cooling effect is thus obtained. As a result, a rise in the temperature of the first member 13 and the second member 14 can be suppressed.

FIG. 2A illustrates an enlarged sectional view of the detector 1 according to the present embodiment. Although the first member 13 and the second member 14 are depicted here as having the same thickness, the first member 13 may be thinner than the second member 14. Further, it is desirable to arrange the support part 20 in the second region 11.

For example, while the mechanical strength of the first member 13 can be enhanced if the support part 20 is present in the first region 10, a radioactive ray entering the first region 10 will be reflected at the boundary between the first member 13 and the support part 20. On the other hand, if the support part 20 is arranged more outside the boundary between the first region 10 and the second region 11, the contact area between the second member 14 and the support part 20 will decrease, and the effect of dissipating generated heat of the second member 14 will decrease. It is therefore desirable that the edge end of the opening 201 of the support part 20 be located on the boundary between the first region 10 and the second region 11. Similarly, it is also desirable that the edge ends of the opening 211 of the third member 21 and the opening 221 of the fourth member 22 be located on the boundary between the first region 10 and the second region 11.

The thermal conductive member 30 can be connected to the electrode 33a drawn to the front surface from the wiring layer 32a of a semiconductor layer of the second member 14 in the second region 11. The electrode 33a is a ground electrode and is fixed at a ground voltage that is a constant potential. The thermal conductive member 30 is connected to the electrode 33a and fixed at the constant potential. When the outermost surface of the second member 14 is a passivation layer (not illustrated), an opening may be provided in the passivation layer to connect the electrode 33a and the thermal conductive member 30 to each other. The thermal conductive member 30 is an electrical conductor, at least a part of the wiring layer 32a of the second member 14 is at a fixed potential for supplying the ground voltage, and the fourth member 22 is also at the same potential as the ground voltage. In such a way, the thermal conductive member 30 is also used as a wiring for supplying the ground voltage, thereby the voltage is stabilized, and as a result, the noise can be suppressed and reduced. Furthermore, to efficiently dissipate heat generated by the second member 14, it is desirable that the part to which the thermal conductive member 30 is connected be a wiring layer connected to inside of the second member 14.

Note that the thermal conductive member 30 is connected to the wiring layer 32a via the electrode 33a in FIG. 2A, however, when a charging prevention layer or an electron beam shielding layer is formed to the second member 14, a heat dissipation effect is obtained even when the thermal conductive member 30 is connected thereto instead of the wiring layer 32a.

Furthermore, the thermal conductive member 30 may be a thermal conductive wiring or a bonding wire. Although gold (Au) that is a material having high thermal conductivity and being less likely to be oxidized is used as an example in the present embodiment, the disclosure is not limited thereto. The thermal conductive member 30 may be gold (Au), silver (Ag), copper (Cu), or aluminum (Al) or an alloy of any of gold, silver, copper, and aluminum. Because a bonding wire used for electrical connection is also used as a heat dissipation path, it is possible to achieve suppression of thermal noise and more effectively utilize the space than in a case where a separate thermal conductive wiring for heat dissipation is connected.

The fourth member 22 is connected to a cooler (not illustrated). For the cooler connected to the fourth member 22, a Peltier element can be used, for example. The Peltier element requires a separate cooling mechanism for heat transfer, and a water-cooling structure is effective when operated in a vacuum. For connection to a cooler including the water-cooling structure, a connection structure (not illustrated) may be present between the fourth member 22 and the cooler.

As set forth, according to the present embodiment, the first member 13 and the second member 14 can be cooled with a low thermal resistance, the capability required for cooling a cooling part can be reduced, and simplification and cost reduction of the device can be achieved. Further, according to the present embodiment, dark current of the pixel unit of the first member 13 can be reduced, and the detector 1 having a high S/N can be provided. As described above, according to the present embodiment, the cooling performance of the detector 1 that detects radioactive rays can be improved, and the sensitivity or the resolution of the detector 1 can be increased.

Second Embodiment

A second embodiment according to the present invention will be described below with reference to FIG. 2B. In the present embodiment, the connection structure between the second member 14 and the fourth member 22 that differs from the first embodiment will be described.

Figure 2B:
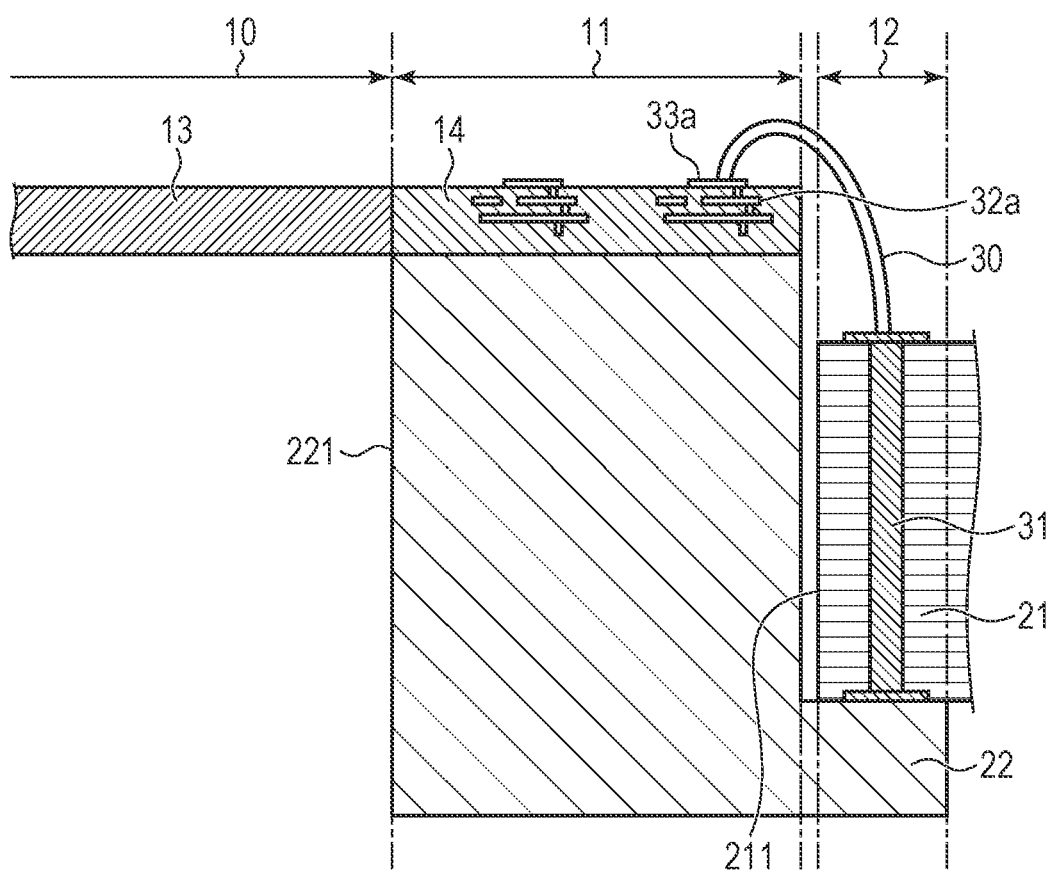
FIG. 2B is a sectional configuration diagram of a detector according to a second embodiment.

FIG. 2B illustrates an enlarged sectional view of a detector according to the present embodiment. The structure illustrated in FIG. 2B is a structure that differs from the structure illustrated in FIG. 2A in that the support part 20 is eliminated and the second member 14 is further connected to the fourth member 22 via an adhesive agent or the like without interposing the third member 21. The structure in which the second member 14 is connected to the fourth member 22 without interposing the support part 20 or the third member 21 as with the present embodiment can reduce the number of intervening members and thus can reduce the thermal resistance.

Third Embodiment

In the second embodiment, the first member 13 and the second member 14 that are semiconductor layers of silicon or the like are thinned, and the second member 14 is connected to the fourth member 22 that is significantly different in physical properties such as stress, distortion, a thermal expansion coefficient, or the like. Thus, in the second embodiment, a mechanical load may be applied to the thinned first member 13 or second member 14, and there is a risk of an increased possibility of a failure. To address this, a third embodiment according to the present invention will be described below with reference to FIG. 2C.

Figure 2C:
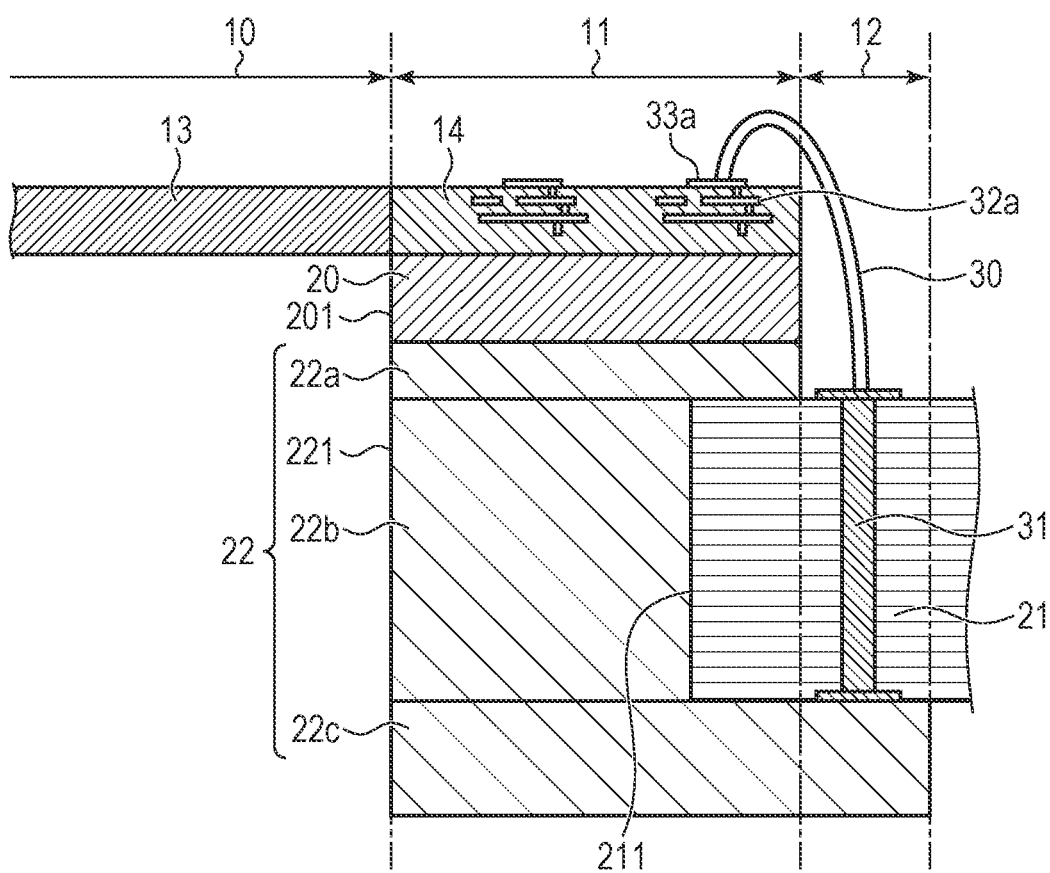
FIG. 2C is a sectional configuration diagram of a detector according to a third embodiment.

FIG. 2C illustrates an enlarged sectional view of a detector according to the present embodiment. The structure illustrated in FIG. 2C is a structure in which the fourth member 22 is divided into multiple portions and the fourth member 22 is connected to the third member 21 from above and below. In the structure illustrated in FIG. 2C, the fourth member 22 is divided into three of a fourth member 22a, a fourth member 22b, and a fourth member 22c in this order from the near side to the far side from the second member 14. The support part 20 may intervene between the second member 14 and the fourth member 22a in the same manner as in the first embodiment, or no support part 20 may intervene therebetween as in the same manner as in the second embodiment. The fourth member 22a is connected to the third member 21 and the fourth member 22b on the back surface side. The third member 21 and the fourth member 22b are connected to the fourth member 22c on the back surface side. These members are connected to each other via an adhesive agent, grease, or the like.

In the present embodiment, since the fourth member 22 is divided as described above, the support part 20 or the second member 14 can be connected to the fourth member 22a in advance before respective members are connected to each other. This makes it possible to increase the strength of the first member 13 and the second member 14 and then connect the first member 13 and the second member 14 to the remaining members of the fourth member 22b, the fourth member 22c, and the third member 21. According to the present embodiment where respective members can be connected to each other in such a way, the mechanical load to the first member 13 or the second member 14 applied by pressing or the like during connection can be reduced.

Fourth Embodiment

In the third embodiment, division of the fourth member 22 into multiple portions requires an adhesive agent, grease, or the like to intervene therebetween, and such intervention may increase the thermal resistance. To address this, a fourth embodiment according to the present invention will be described below with reference to FIG. 2D.

Figure 2D:
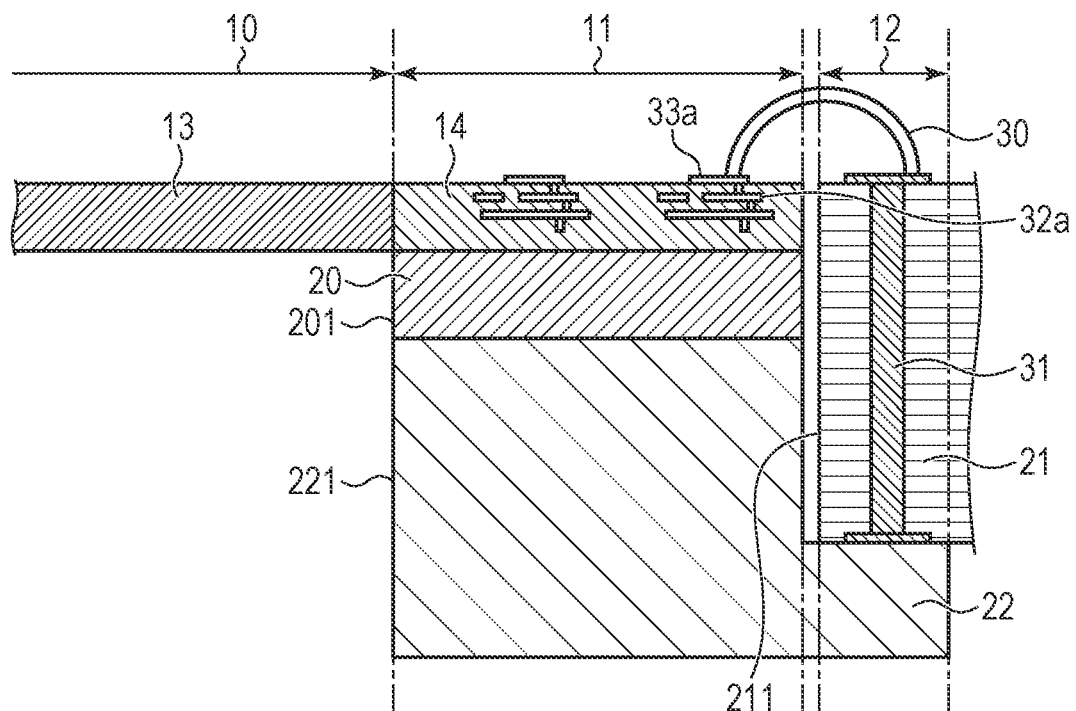
FIG. 2D is a sectional configuration diagram of a detector according to a fourth embodiment.

FIG. 2D illustrates an enlarged sectional view of a detector according to the present embodiment. The structure illustrated in FIG. 2D is a structure in which the thickness of the support part 20 or the fourth member 22 is adjusted so that the front surface of the second member 14 and the front surface of the penetration part 31 are at the same level. The front surface of the second member 14 and the front surface of the penetration part 31 that are at the same level are connected to one end and the other end of the thermal conductive member 30, respectively.

In the structure illustrated in FIG. 2D, since the front surface of the second member 14 and the front surface of the penetration part 31 are at the same level, the length of the thermal conductive member 30 can be reduced, and the thermal resistance of the thermal conductive member 30 proportional to the length can be reduced. Therefore, the structure illustrated in FIG. 2D is advantageous in cooling the second member 14.

Fifth Embodiment

A fifth embodiment according to the present invention will be described below with reference to FIG. 3A to FIG. 3C. In the present embodiment, the sectional structure of the penetration part 31 that may be employed in any of other embodiments will be described.

Figure 3A:
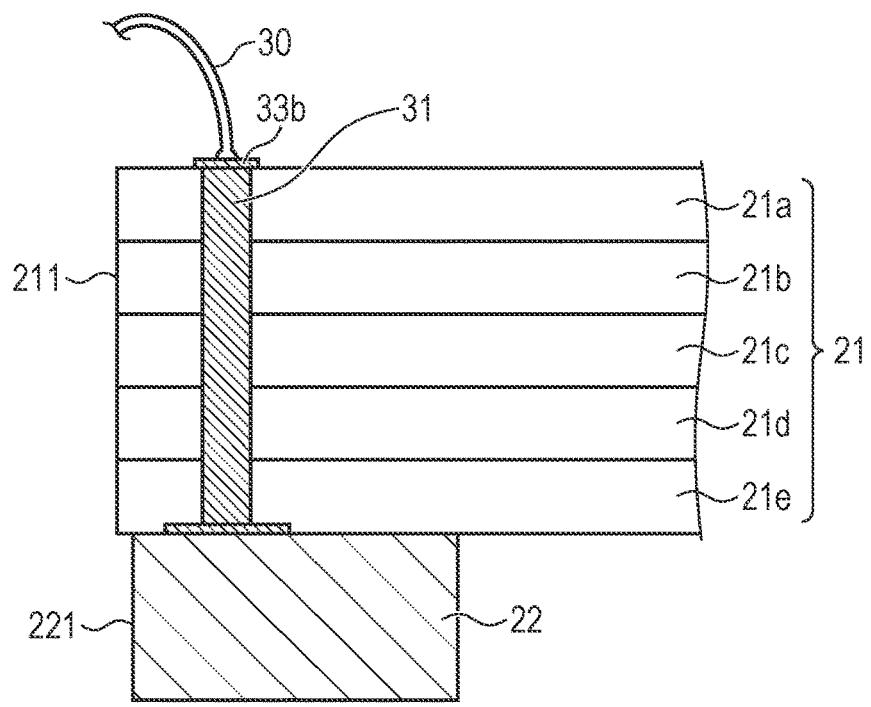
FIG. 3A is a sectional configuration diagram of a detector according to a fifth embodiment.

FIG. 3A illustrates an enlarged sectional view of the penetration part 31 according to the present embodiment. As illustrated in FIG. 3A, an electrode 33b is provided on the front surface side of the penetration part 31. The penetration part 31 is connected to the thermal conductive member 30 via the electrode 33b on the front surface side. The penetration part 31 is connected to the thermal conductive member 30 via the electrode 33b in such a way, and this improves easiness of connection. The penetration part 31 is connected to the fourth member 22 connected to a cooler (not illustrated) on the back surface side.

The third member 21 is a circuit substrate connected to a large number of wirings of the second member 14 and has the multi-layered laminated structure having a plurality of insulator layers and wiring layers. Note that, also for the third member 21 in other embodiments, FIG. 3A illustrates the multi-layered structure including a plurality of laminated layers 21a to 21e as an example of the laminated structure of the third member 21. Note that, also in other embodiments, the third member 21 may have the same multi-layered structure as the present embodiment. When the third member 21 has the multi-layered laminated structure and when the number of layers is increased and if the thickness of the detector including the third member 21 is further increased, the effect of cooling the second member 14 via the thermal conductive member 30 and the penetration part 31 is further increased.

As the penetration part 31, a plurality of ground voltage wirings electrically insulated from the laminated structure of the third member 21 and fixed at a constant potential can also be used. The wirings of a plurality of ground voltages set for reducing the electrical impedance can be used to share a plurality of heat dissipation paths.

Various modifications can be made to the present embodiment. FIG. 3B and FIG. 3C illustrate enlarged sectional views of the penetration part 31 according to modified examples of the present embodiment.

Figure 3B:
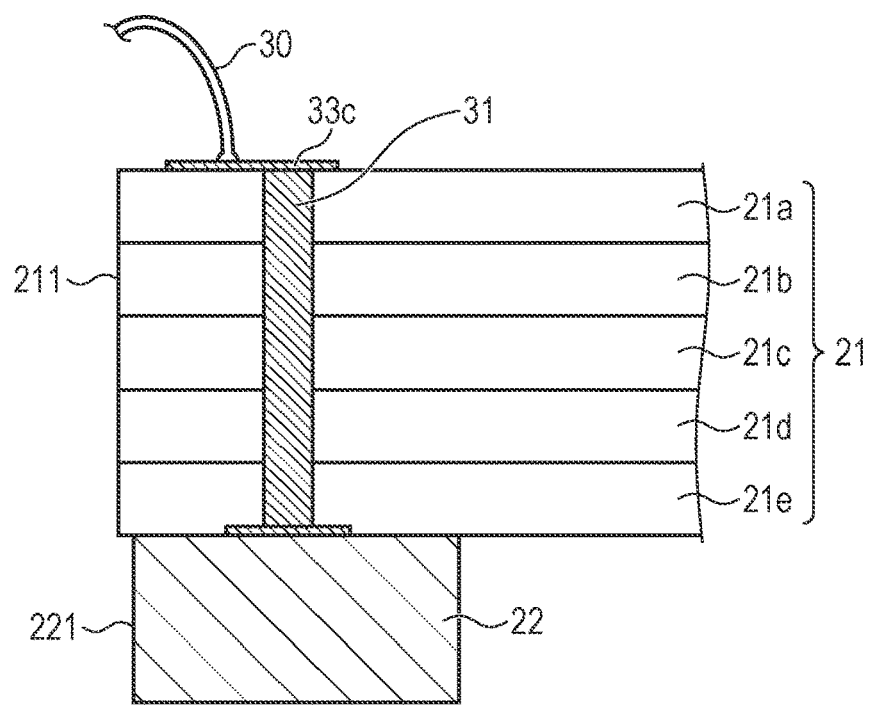
FIG. 3B is a sectional configuration diagram of a detector according to a modified example of the fifth embodiment.

In a modified example of the present embodiment, as illustrated in FIG. 3B, the thermal conductive member 30 and the penetration part 31 may be connected via an electrode 33c extended in the same plane. In such a case, the mechanical strength of a wire bonding or the like that may be used as the thermal conductive member 30 can be maintained.

Figure 3C:
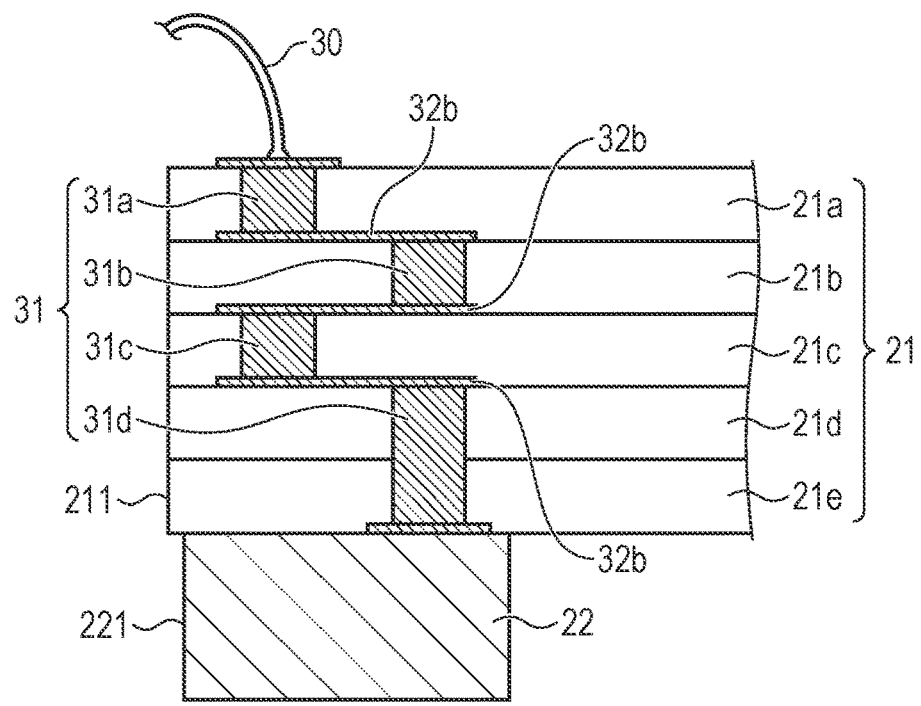
FIG. 3C is a sectional configuration diagram of a detector according to a modified example of the fifth embodiment.

Further, in another modified example of the present embodiment, as illustrated in FIG. 3C, each portion of the penetration part 31 divided into a plurality of portions 31a to 31d, for example, inside the third member 21 may be connected via a plurality of wirings 32b inside the third member 21. In such a case, the plurality of portions 31a to 31d of the penetration part 31 are arranged so as to be offset in the in-plane direction of the multiple layers in the third member 21. Each wiring 32b is a metal wiring and is provided so as to connect adjacent two portions of the penetration part 31 to each other. Also in the present modified example, the thermal conduction caused by free electrons in the wirings 32b that are metal wirings can be utilized as a heat dissipation path.

As set forth, the sectional structure of the penetration part 31 with reference to FIG. 3A to FIG. 3C has been described. For example, a plurality of thermal conductive members 30 at the same potential may be connected commonly to the same penetration part 31, or the penetration parts 31 may be connected inside the third member 21. Furthermore, with a plurality of penetration parts 31 being arranged in the third region 12 of the third member 21, a more cooling effect is obtained.

Sixth Embodiment

Figure 3D:
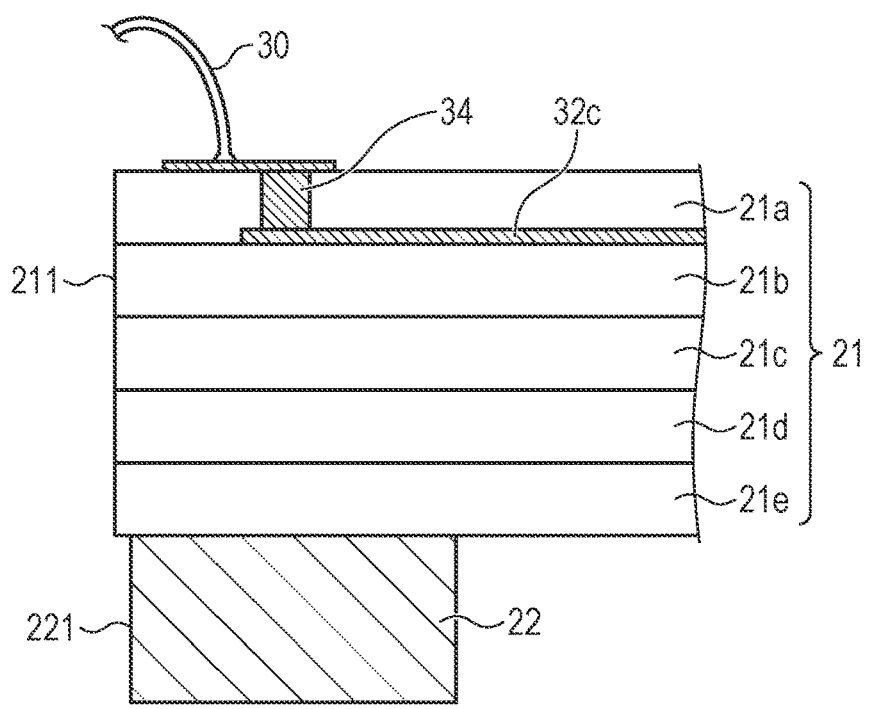
FIG. 3D is a sectional configuration diagram of a detector according to a sixth embodiment.

In all the embodiments of the present invention, at least some of the thermal conductive members 30 and the penetration parts 31 are connected to each other, and no all the thermal conductive members 30 are required to be connected to the penetration parts 31. For example, when the thermal conductive member 30 is also used as a thermal conductive wiring or a bonding wire, some of the thermal conductive members 30 are not required to be connected to the penetration parts 31. In such a case, as illustrated in FIG. 3D, some of the thermal conductive members 30 may be connected to a wiring 32c provided inside the third member 21 via a via 34 or the like and may be connected to an electric component or the like (not illustrated) of the third member 21 via the wiring 32c. Although it is difficult to obtain a cooling effect in the structure illustrated in FIG. 3D alone, it is possible to obtain a cooling effect as the overall detector 1 by combining the structure thereof with the penetration part 31 illustrated in at least any of FIG. 3A to FIG. 3C in any manner.

Seventh Embodiment

A seventh embodiment according to the present invention will be described below with reference to FIG. 4A and FIG. 4B. In the present embodiment, the arrangement of the penetration part 31 that may be employed in any of other embodiments will be described.

Figure 4A:
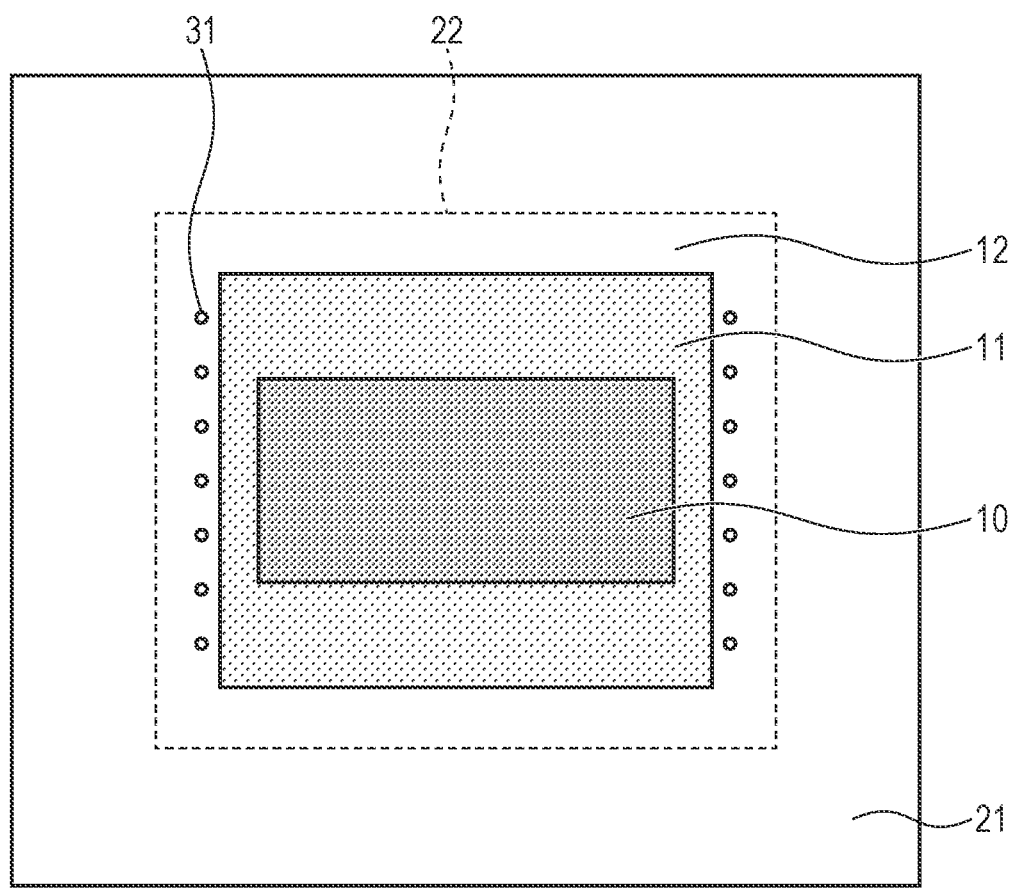
FIG. 4A is a configuration diagram in the planar view of a detector according to a seventh embodiment.
Figure 4B:
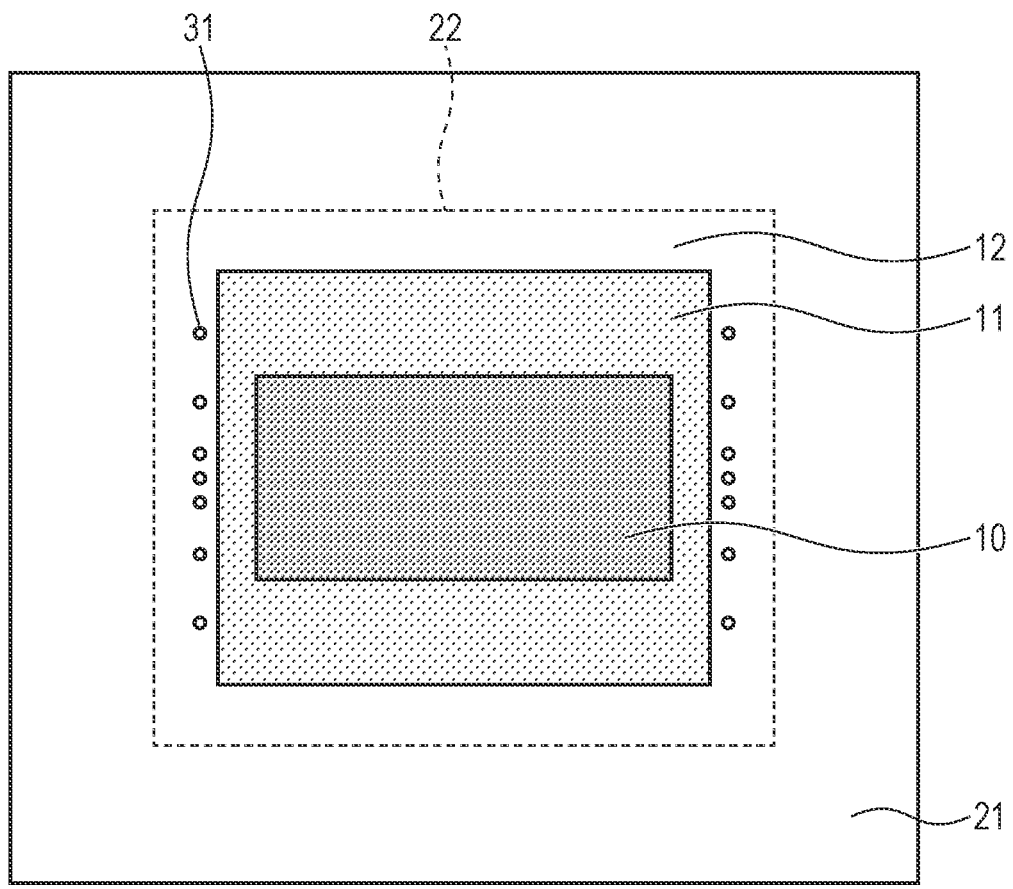
FIG. 4B is a configuration diagram in the planar view of the detector according to the seventh embodiment.

FIG. 4A and FIG. 4B are illustration diagrams of the present embodiment, which are top views illustrating the positional relationship between the first region 10, the second region 11, and the third region 12 and the arrangement of the penetration parts 31 in the third region 12. Each of FIG. 4A and FIG. 4B, the fourth member 22 is formed to the back surface of the third member 21, and the outer circumference of the fourth member 22 is indicated by the broken line. Note that, in FIG. 4A and FIG. 4B, the thermal conductive member 30 is omitted.

The third region 12 where the third member 21 and the fourth member 22 overlap each other outside the second region 11 is a region from the solid line indicating the outer circumference of the second region 11 to the broken line indicating the outer circumference of the fourth member 22 in FIG. 4A and FIG. 4B. The penetration parts 31 are arranged in the third region 12 and connected to the second member 14 by the thermal conductive member 30.

Further, in general, each region of the first region 10, the second region 11, and the third region 12 has substantially a rectangular outer circumference in the planar view from the top because of the configuration of an image sensor. It is desirable to arrange the penetration parts 31 to positions close to the second region 11 inside the third region 12 in order to reduce the length of the thermal conductive member 30.

Furthermore, while the second region 11 has a structure in which other members are present on the back surface, the first region 10 has the open structure in the back surface and is in a vacuum on the back surface side. Therefore, a higher heat dissipation effect is obtained when the penetration parts 31 are arranged at positions close to the first region 10 that less contributes to heat dissipation to the back surface.

As illustrated in FIG. 4A, it is effective in obtaining a cooling effect to arrange the penetration parts 31 on the side near the outer circumference of two sides of the third region 12 having a smaller distance to the outer circumference of the rectangular first region 10 in the planar view out of the four sides of the outer circumference of the third region 12 having the rectangular outer circumference in the planar view. Naturally, the penetration parts 31 may be arranged on the side near the four sides of the outer circumference of the third region 12.

Note that, although the case where the penetration parts 31 are arranged at the same interval is illustrated in FIG. 4A, the penetration parts 31 are not necessarily required to be arranged at the same interval. FIG. 4B illustrates an example in which the penetration parts 31 are arranged at positions closer to the first region 10 in a concentrated manner. Furthermore, to prevent an uneven temperature distribution from occurring in the first region 10, it is desirable that the arrangement of the penetration parts 31 be arrangement that is line-symmetrical about the first region 10. Note that the number of penetration parts 31 in FIG. 4A and FIG. 4B is an example for simplified illustration, and the number of penetration parts 31 can be determined based on the circuit design or the like of the third member 21.

Eighth Embodiment

An eighth embodiment according to the present invention will be described below with reference to FIG. 5. In the present embodiment, the replaceable structure of the detector 1 that may be employed in any of other embodiments will be described.

Figure 5:
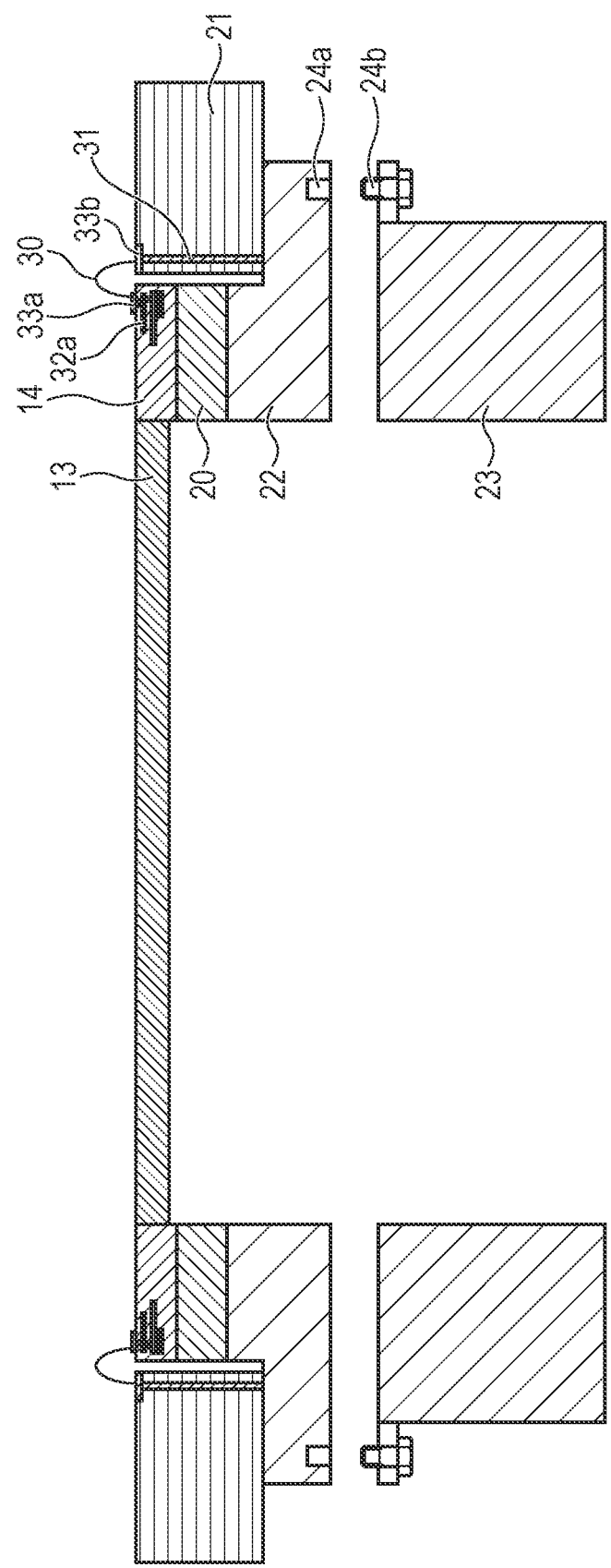
FIG. 5 is a sectional configuration diagram of a detector according to an eighth embodiment.

FIG. 5 illustrates a sectional configuration diagram of the detector 1 according to the present embodiment. The detector 1 can be configured such that the detector 1 or a part of the detector 1 can be replaced when deterioration, electrical charging, or other malfunctions inside the detector 1 have occurred due to irradiation with radioactive rays.

The structure illustrated in FIG. 5 is the structure in which a fixing part 24a is provided to the fourth member 22 and a fixing part 24b is provided to a cooler 23. The fixing part 24a and the fixing part 24b have such a structure that can be coupled and fixed to each other. The fixing part 24a and the fixing part 24b, which correspond to each other, are fixed to each other, and thereby the cooler 23 is fixed where the whole of a part of the surface thereof is in contact with the whole or a part of the back surface of the fourth member 22. To more reliably fix the cooler 23 to the fourth member 22, multiple pairs of fixing parts 24a and fixing parts 24b may be provided. In such a way, the fourth member 22 is detachably connected to the cooler 23 that is another member on the opposite side from the third member 21 with respect to the fourth member 22 as a reference.

To prevent a gap from occurring between the fourth member 22 and the cooler 23, it is possible to fill the gap between the fourth member 22 and the cooler 23 by using a reconnectable material such as grease, gel, or the like. This can suppress and reduce an increase in the thermal resistance due to a gap. In the structure illustrated in FIG. 5, since the fourth member 22 can be separated from the cooler 23 to detach the detector 1 from the cooler 23, improved maintenance of a device with the detector 1 and a cost reduction due to partial replacement are made possible.

Note that, although FIG. 5 illustrates the example based on the structure of FIG. 2D, the present disclosure is not limited thereto. For example, the detector having the structure of any one of FIG. 2A to FIG. 2C can be configured in the same manner as the present embodiment. For example, it is also possible in the structure of FIG. 2A that the fixing parts 24a and 24b are arranged to the third member 21 and the fourth member 22, respectively, and the fourth member 22 can be fixed to the third member 21. In such a case, the third member 21 is detachably connected to the fourth member 22. In such a case, the fourth member 22 can be excluded from a group of components to be replaced, and this further enables a cost reduction at replacement. When the detector 1 is configured within the scope not departing from the concept of the replaceable structure, the cooling effect is obtained.

Ninth Embodiment

A ninth embodiment according to the present invention will be described below with reference to FIG. 6. In the present embodiment, a radiation imaging device with any of the detectors 1 according to the first to eighth embodiments will be described.

Figure 6:
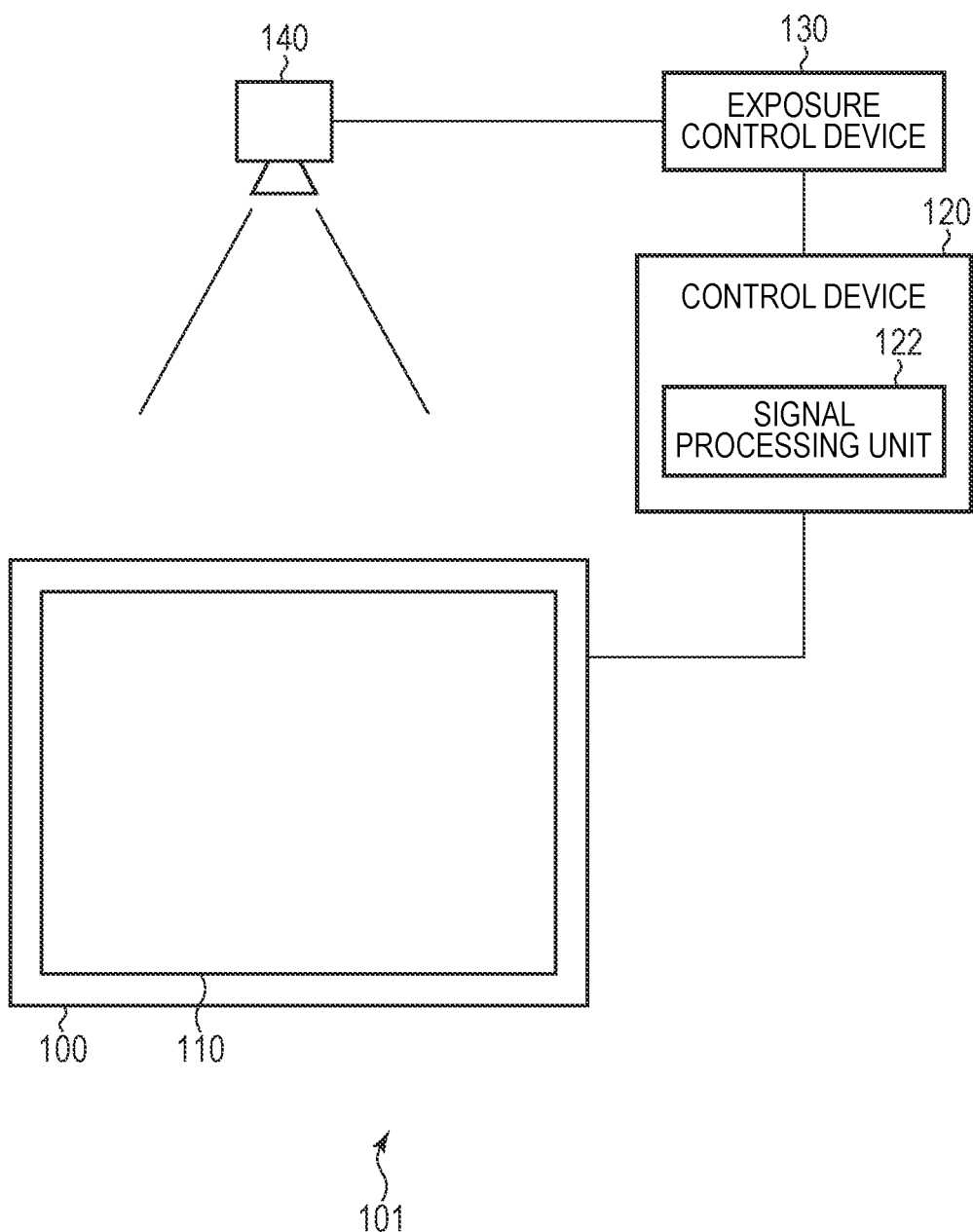
FIG. 6 is a schematic configuration diagram of a radiation imaging device according to a ninth embodiment.

FIG. 6 illustrates a configuration of a radiation imaging device 101 according to the present embodiment. The radiation imaging device 101 that is one aspect of the radiation detection device may include a detector 100 including a pixel array 110 having a plurality of pixels and a signal processing unit 122 that processes a signal from the detector 100. Any of the detectors 1 according to the first to eighth embodiments can be applied as the detector 100. The detector 100 may have a panel shape, for example. The signal processing unit 122 may be configured as a part of a control device 120 as illustrated in FIG. 6, may be housed in the same casing as the casing that houses the detector 100, or may be housed in in a different casing from the casing that houses the detector 100 and the casing that houses the control device 120. The radiation imaging device 101 is a device for acquiring a radiation image by the energy subtraction method. The energy subtraction method is a method for capturing an image of a subject for multiple times with different energy of radioactive rays to irradiate the subject and processing a plurality of acquired images to acquire a new radiation image (for example, a bone image and a soft tissue image). The term of radioactive ray/radiation may include, for example, alpha rays, beta rays, gamma rays, particle beams, and cosmic rays in addition to X-rays.

The radiation imaging device 101 may include a radiation source 140 that generates radioactive rays, an exposure control device 130 that controls the radiation source 140, and the control device that controls the exposure control device 130 (the radiation source 140), and a control device 120 that controls the detector 100. The control device 120 that is a control unit may include the signal processing unit 122 that processes a signal supplied from the detector 100, as described above. All or some of the functions of the control device 120 may be incorporated in the detector 100. Alternatively, some of the functions of the detector 100 may be incorporated in the control device 120. The control device 120 may be formed of a computer (processor) and a memory storing a program provided to the computer. The signal processing unit 122 may be formed of a part of the program. Alternatively, the signal processing unit 122 may be formed of a computer (processor) and a memory storing a program provided to the computer. The whole or a part of the control device 120 may be formed of a digital signal processor (DSP) or a programmable logic array (PLA). The control device 120 and the signal processing unit 122 may be designed and manufactured by using a logic synthesis tool based on a file describing the operation thereof.

The exposure control device 130 has an exposure switch, for example, and in response to turning on of the exposure switch, causes the radiation source 140 to emit a radioactive ray, and notifies the control device 120 of information indicating a timing that the radioactive ray is emitted. Alternatively, in response to an instruction from the control device 120, the exposure control device 130 causes the radiation source 140 to emit a radioactive ray.

In a continuous radiation period of a radioactive ray from the radiation source 140, radioactive rays having varying energy (wavelength) may be emitted. By using such radioactive rays, acquiring respective radiation images at two types of energy that are different from each other, and processing these radiation images by the energy subtraction method, it is possible to acquire a single new radiation image.

Alternatively, the radiation source 140 may have a function of changing energy (wavelength) of the radioactive ray. The radiation source 140 may have a function of changing a tube voltage (a voltage applied between the cathode and the anode of the radiation source 140) to change the energy of radioactive ray, for example.

Each of the plurality of pixels forming the pixel array 110 of the detector 100 may have a conversion element that converts a radioactive ray into an electrical signal (for example, charges), a processing circuit that processes an electrical signal output from the conversion element, and a holding unit that samples and holds electrical signals output from the processing circuit. Each conversion element may be configured to directly convert a radioactive ray into an electrical signal or may be configured to convert a radioactive ray into light such as visible light and then convert the light into an electrical signal. In the latter, a scintillator may be used for converting a radioactive ray into light. The scintillator may be shared by a plurality of pixels of the pixel array 110.

Tenth Embodiment

A tenth embodiment according to the present invention will be described below with reference to FIG. 7. In the present embodiment, a device that is a detection system including a photoelectric conversion device with the detector 1 and a processing device that processes a signal output from the photoelectric conversion device will be described as an application example as the photoelectric conversion device of the detector 1 according to the first to eighth embodiments.

The detection system has at least the photoelectric conversion device and the signal processing circuit that processes a signal output from the photoelectric conversion device, and a portion responsible for signal processing out of the configuration illustrated in FIG. 7 described below may be provided to the cloud. Herein, a device in which the photoelectric conversion device with the detector 1 is incorporated as an imaging device will be described as an example. The device in which the photoelectric conversion device is incorporated as an imaging device may be, for example, an electronic device such as a camera, a smartphone, or the like. Herein, the concept of a camera includes not only an apparatus mainly intended to photographing but also a device supplemented with a photographing function (for example, a mobile terminal such as a personal computer or a tablet computer).

Figure 7:
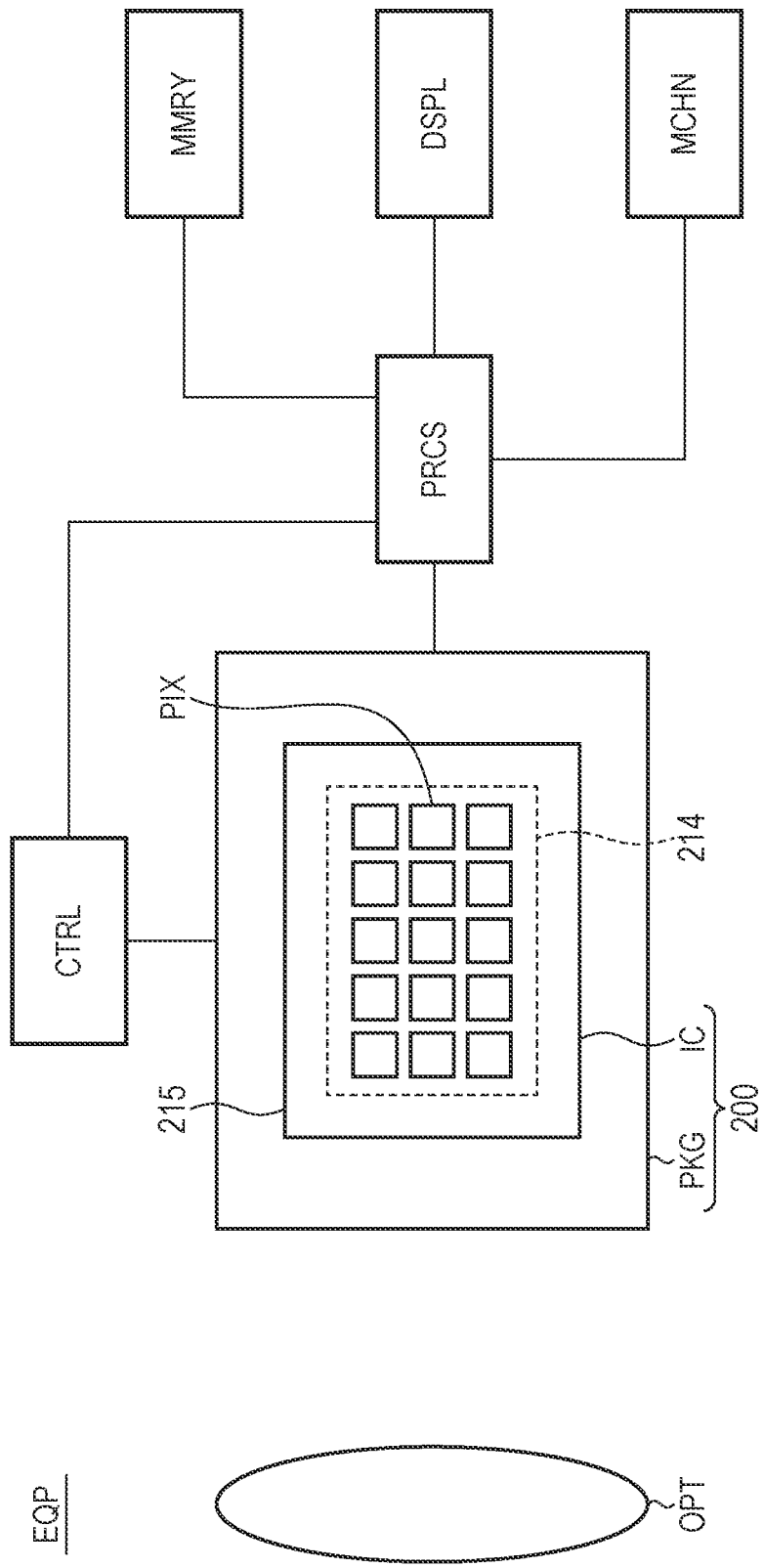
FIG. 7 is a schematic configuration diagram of a photoelectric conversion device according to a tenth embodiment.

FIG. 7 is a schematic diagram of equipment EQP to which a photoelectric conversion device 200 is mounted. Examples of the equipment EQP may be electronic devices (information devices) such as a camera described above, a smartphone, or the like or a business machine such as a copier machine, a scanner, or the like. Further, other examples of the equipment EQP may be a transportation apparatus such as an automobile an aircraft, a ship, a train vehicle, or the like, a medical device such as an endoscope, a radiation imaging device, or the like, an analysis device such as a scanning electron microscope, a transmission electron microscope, or the like, or an industrial machine such as an industrial robot.

The photoelectric conversion device 200 may include a package PKG that containing a semiconductor device IC in addition to a semiconductor device IC including a semiconductor chip provided with a pixel region 214 in which pixels PIX are arranged in an array. The package PKG may include a base material to which a semiconductor device IC is fixed, a lid such as glass facing the semiconductor device IC, and a connection member such as a bonding wire, a bump, or the like connecting terminals provided to the base material to terminals provided to the semiconductor device IC. As the photoelectric conversion device 200, any of the detectors 1 according to the first to eighth embodiments can be applied.

The equipment EQP may further include at least any of an optical system OPT, a control device CTRL, a processing device PRCS, a display device DSPL, a memory device MMRY, and a mechanical device MCHN. The optical system OPT captures an image on the photoelectric conversion device 200 and is a lens, a shutter, or a mirror, for example. The control device CTRL controls the operation of the photoelectric conversion device 200 and is a semiconductor device such as an ASIC, for example. The processing device PRCS processes a signal output from the photoelectric conversion device 200 and is a semiconductor device such as a CPU or an ASIC used for configuring analog front end (AFE) or digital front end (DFE). The display device DSPL is an EL display device or a liquid crystal display device that displays information (image) obtained by the photoelectric conversion device 200. The memory device MMRY is a magnetic device or a semiconductor device that stores information (image) obtained by the photoelectric conversion device 200. The storage device MMRY is a volatile memory such as an SRAM or a DRAM or a nonvolatile memory such as a flash memory or a hard disk drive. The mechanical device MCHN has a movable unit or a thrust unit such as a motor, an engine, or the like. The mechanical device MCHN in a camera can drive a component of the optical system OPT for zooming, focusing, or shutter operation. In the equipment EQP, a signal output from the photoelectric conversion device 200 is displayed on the display device DSPL or externally transmitted by a communication device (not illustrated) of the equipment EQP. Thus, the equipment EQP may further include the memory device MMRY or the processing device PRCS separately from a storage circuit unit or a calculation circuit unit included in a peripheral region 215 or the like such as control/signal processing circuit of the photoelectric conversion device 200.

The configuration illustrated in each embodiment or each modified example according to the present invention described above can be used in any combination with each other. The detector of the present invention may have a substrate having not only silicon or germanium but also CdTe or CZT (CdZnTe), for example, as a main component as a substrate forming the first member 13 and the second member 14.

According to the present invention, a technology that is advantageous in improving the cooling performance of a detector that detects radioactive rays and enhancing the sensitivity or the resolution of the detector can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-020118, filed Feb. 14, 2022, which is hereby incorporated by reference herein in its entirety.

What is claimed is:
1. A detector comprising:
a first member that detects a radioactive ray;
a second member located around the first member;
a third member having a first opening overlapping at least a part of a first region on which the first member is projected in a planar view including the first member and the second member;
a fourth member having a second opening overlapping at least a part of the first region in the planar view and having higher thermal conductivity than the third member; and
a penetration part provided in a third region overlapping the fourth member outside a second region on which the second member is projected in the planar view, connected to the fourth member, connected to the second member via a thermal conductive member, and having higher thermal conductivity than the third member.

2. The detector according to claim 1,
wherein the first member includes a plurality of pixels for forming an image based on the radioactive ray, and
wherein the second member includes a peripheral circuit including a signal processing circuit and input/output terminals.

3. The detector according to claim 1,
wherein the radioactive ray is an electron beam, and
wherein a region formed of the first opening is in a vacuum.

4. The detector according to claim 1, wherein at least a part of the first member has a thickness within a range of 10 μm to 100 μm.

5. The detector according to claim 1, wherein at least a part of the first member has a thickness within a range of 25 μm to 75 μm.

6. The detector according to claim 1, wherein the thermal conductive member is an electrical conductor and is connected to a ground electrode and fixed at a constant potential.

7. The detector according to claim 1, wherein the thermal conductive member is a thermal conductive wiring or a bonding wire and comprises a material of gold, silver, copper, or aluminum or an alloy of any of gold, silver, copper, and aluminum.

8. The detector according to claim 1, wherein the thermal conductive member is connected to a wiring layer included in a semiconductor layer of the second member.

9. The detector according to claim 1, wherein a surface of the second member connected to the thermal conductive member and a surface of the penetration part connected to the thermal conductive member are at the same level.

10. The detector according to claim 1, wherein the penetration part is a thermal conductor or an electrical conductor material and includes gold, tungsten, copper, titanium, tantrum, aluminum, ruthenium, or carbon graphite in at least a part of the penetration part.

11. The detector according to claim 1,
wherein the first region, the second region, and the third region each have a rectangular outer circumference in the planar view, and
wherein the penetration part is arranged on an outer circumference side of two sides out of four sides of the outer circumference of the third region, the two sides having a smaller distance to the outer circumference of the first region.

12. The detector according to claim 1, wherein the third member is a printed circuit board or a ceramic substrate.

13. The detector according to claim 1, wherein the second member, the third member, and the fourth member are connected by an adhesive agent, grease, gel, solder, or a die bond material in connections to other members, respectively.

14. The detector according to claim 1, wherein the third member is detachably connected to the fourth member, or the fourth member is detachably connected to another member on an opposite side of the third member with respect to the fourth member as a reference.

15. The detector according to claim 1, wherein the second member is connected to the third member or the fourth member.

16. The detector according to claim 1, wherein the first member contains silicon, germanium, or cadmium.

17. A radiation detection device comprising:
   the detector according to claim 1;
   a radiation source that generates the radioactive ray; and
   a control unit that controls the detector and the radiation source.

18. A detection system comprising:
   the detector according to claim 1; and
   a processing circuit that processes a signal from the detector.

* * * * *